(12) United States Patent
Bitonti et al.

(10) Patent No.: US 8,996,491 B2
(45) Date of Patent: Mar. 31, 2015

(54) RESOLUTION OF CONTACT NAMES (71) Applicant: International Business Machines Corporation, Armonk, NY (US)

(72) Inventors: Thomas F. Bitonti, Cary, NC (US); Wendell J. Bouknight, Jr., Clayton, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/708,251

(22) Filed: Dec. 7, 2012

(65) Prior Publication Data
US 2014/0164372 A1 Jun. 12, 2014

(51) Int. Cl.
*G06F 17/30* (2006.01)

(52) U.S. Cl.
CPC ................ *G06F 17/30554* (2013.01)
USPC ............. 707/705; 707/706; 707/748

(58) Field of Classification Search
CPC ...................................... H04L 51/26
USPC ......................... 707/705, 706, 748
See application file for complete search history.

(56) References Cited

U.S. PATENT DOCUMENTS

| 7,020,686 | B2 | 3/2006 | Banatwala |
| 7,305,381 | B1* | 12/2007 | Poppink et al. ................ 1/1 |
| 7,640,550 | B1 | 12/2009 | Goel et al. |
| 8,380,527 | B2* | 2/2013 | Fisher ...................... 705/1.1 |
| 2002/0188483 | A1* | 12/2002 | Fisher ........................ 705/4 |
| 2006/0209690 | A1* | 9/2006 | Brooke ..................... 370/230 |
| 2008/0059627 | A1* | 3/2008 | Hamalainen et al. ........ 709/224 |
| 2009/0157705 | A1 | 6/2009 | Nomiyama |
| 2009/0171904 | A1 | 7/2009 | O'Sullivan et al. |
| 2009/0274291 | A1 | 11/2009 | Barnett et al. |
| 2011/0213785 | A1* | 9/2011 | Kristiansson et al. ........ 707/748 |
| 2012/0246245 | A1* | 9/2012 | Nilsson .................... 709/206 |
| 2013/0103547 | A1* | 4/2013 | Fisher ...................... 705/26.41 |

* cited by examiner

*Primary Examiner* — Baoquoc N To
(74) *Attorney, Agent, or Firm* — Scully, Scott, Murphy & Presser, P.C.

(57) ABSTRACT

Mechanisms are provided to permit a first person (e.g., Tom) to be in a communication session (e.g., a chat session) with a second person (e.g., George) and to select a contact's name (e.g., Harry), and immediately set up another communication (e.g., a chat session) with the selected contact (e.g., Harry). Since there may be multiple contacts having the same name as the selected contact, e.g., "Harry", mechanisms are provided to communicate with a desired person (e.g., "Harry Smith" and not "Harry Jones"). The mechanisms may make such a determination based on "Harry Smith" being the more likely person that Tom, the first person, desires to communicate with (e.g., based on a context of Tom and/or Harry Smith).

19 Claims, 4 Drawing Sheets

RESOLUTION OF CONTACT NAMES

BACKGROUND

The present disclosure relates generally to the field of resolution of contact names.

Conventionally, in many applications (such as in instant messaging applications, email applications, in smartphone conversations, web browsing, etc.), there will often be reference to a "contact" and a user will want to immediately go to that contact (e.g., to obtain further information).

For example, if a first user is in a chat session with a second user (e.g., John), the second user might ask "Hi, have you talked to Tom about our new patent disclosure?" (referring to Tom as a third user). In this case, the first user might need to go set up a separate communication with Tom, the third user. However, a lot of manual activity is typically required to set up such a separate communication.

In the above scenario, there are a conventionally a few options:

As one option, if the contact's full email (e.g., tom@abc.com) is used in the conversation, then chat or email can be initiated with the contact through automatic link generation. This is true for telephone numbers or other explicitly identifiable data, too, but these linkages do not typically allow for natural use of vocabulary (e.g., referencing "Tom" and not tom@abc.com).

As another option, the user can manually establish a communication with the contact (e.g. click on an icon for Tom in the user's contact list).

As yet another option, the user can type or cut/paste the contact's name into a search of one of potentially multiple contact lists to find the contact and subsequently initiate the communication.

Further, some disambiguation methodologies exist. These include straight-forward, non-subject-related types of disambiguation (e.g., multiple similar names, then disambiguation based on frequency of communication with that name) and the searching of multiple sources of contact information.

SUMMARY

In one example, the present disclosure relates to the field of resolution of a contact name selection (e.g., selected from a list or otherwise input).

In another example, the present disclosure relates to the field of resolution of a non-unique contact name.

In other examples, resolution of contact names (e.g., non-unique contact name selections) may be implemented in the form of systems, methods and/or algorithms.

In one embodiment, a method implemented in a computer system for providing prioritized contact communications is provided, the method comprising: identifying, by the computer system, a plurality of contact lists comprising at least a first contact list and a second contact list, wherein the first contact list comprises contact information for at least a first person and the second contact lists comprises contact information for at least a second person; identifying, by the computer system, an indicium of a person whose contact information is sought; prioritizing, by the computer system, the first and second contact lists such that one of the first and second contact lists takes precedence over the other of the first and second contact lists; and searching, by the computer system, the contact lists in the prioritized order for the contact information being sought, wherein the searching is based at least in part upon the identified indicium.

In another embodiment a computer readable storage medium, tangibly embodying a program of instructions executable by the computer for providing prioritized contact communications is provided, the program of instructions, when executing, performing the following steps: identifying, by the computer, a plurality of contact lists comprising at least a first contact list and a second contact list, wherein the first contact list comprises contact information for at least a first person and the second contact lists comprises contact information for at least a second person; identifying, by the computer, an indicium of a person whose contact information is sought; prioritizing, by the computer, the first and second contact lists such that one of the first and second contact lists takes precedence over the other of the first and second contact lists; and searching, by the computer, the contact lists in the prioritized order for the contact information being sought, wherein the searching is based at least in part upon the identified indicium.

In another embodiment, a computer-implemented system for providing prioritized contact communications is provided, the system comprising: an identifying element configured to identify: (a) a plurality of contact lists comprising at least a first contact list and a second contact list, wherein the first contact list comprises contact information for at least a first person and the second contact lists comprises contact information for at least a second person; and (b) an indicium of a person whose contact information is sought; a prioritizing element in operative communication with the identifying element configured to prioritize the first and second contact lists such that one of the first and second contact lists takes precedence over the other of the first and second contact lists; and a searching element in operative communication with the identifying element and the prioritizing element configured to search the contact lists in the prioritized order for the contact information being sought, wherein the searching is based at least in part upon the identified indicium.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for automatically resolving contact names (e.g., non-unique contact name selections). In another example, one or more methods may provide for automatically resolving contact names (e.g., non-unique contact name selections). In another example, one or more algorithms may provide for automatically resolving contact names (e.g., non-unique contact name selections).

For the purposes of describing and claiming the present invention the term "frequency of communication" is intended to refer to a number of communication occurrences (e.g., total number of occurrences or number of occurrences in one or more time periods) between/among two or more people.

For the purposes of describing and claiming the present invention the term "communication mode" is intended to refer to a type of communication (e.g., instant messaging, email, social media, web browser, chat, private, telephone call (e.g., mobile, home, work, etc.)) between/among two or more people.

For the purposes of describing and claiming the present invention the term "status" is intended to refer to a state (e.g., open, in use, recently accessed) of an application used by a person. In one example, the application may be an online application (e.g., an Internet application). In another example, the application may be running on a computer or mobile device.

For the purposes of describing and claiming the present invention the term "context" is intended to include (but not be limited to) one or more of the following: (a) a frequency of communication between/among two or more people; (b) a communication mode between/among two or more people; (c) a status in an application (such as an online application or an application running on a computer or mobile device); (d) subject matter of one or more current communications; (e) subject matter of one or more past communications; and/or (f) time of day, day of week, day of month, month, year, etc.

As described herein, mechanisms are provided to permit a first person (e.g., Tom) to be in a communication session (e.g., a chat session) with a second person (e.g., George) and to select a contact's name (e.g., Harry), and immediately set up another communication (e.g., a chat session) with the selected contact (e.g., Harry). Since there may be multiple contacts having the same name as the selected contact, e.g., "Harry", mechanisms are provided to communicate with a desired person (e.g., "Harry Smith" and not "Harry Jones"). The mechanisms may make such a determination based on "Harry Smith" being the more likely person that Tom, the first person, desires to communicate with (e.g., based on a context of Tom and/or Harry Smith).

In one example, a user may click (or otherwise select) a non-unique contact name in a chat session (or email, or blog entry or other communication.). Searching a set of contact lists may then be performed in a prioritized manner based on the context of the discussion and/or the participants, to find the most likely match to a given contact name. In this example, which of the many potential contact lists to search for that non-unique contact name would be context-specific. Further, if and when multiple potential matches for the non-unique contact name are found, the correct match could then be determined based on the context as well.

Reference will now be made to another example. In this example, a full list of potential contact lists to include in searches for a given user is determined. This full list of potential contact lists may be based on the user's activities. These activities may include (but not be limited to): (a) an internal (to a specific software application) context-specific history of previous user searches (and subsequent selections); (b) chat client contacts (e.g., SAMETIME, AOL, GOOGLE TALK); (c) email contacts (e.g., LOTUS NOTES, GMAIL, YAHOO, EUDORA, OUTLOOK); (d) phone contacts (e.g., synchronized phone information such as through GOOGLE, HTC SYNC); (e) social media site contacts (e.g., FACEBOOK, LINKEDIN, TWITTER); (f) private (e.g., outsider-maintained) contact lists (e.g., online white pages, internal company directories, YAHOO GROUPS contact lists, FACEBOOK name lookups); and/or (g) contact lists that have other, non-name-oriented keys, such as (but not limited to): (i) conference room lists with contact information for the scheduler; and/or (ii) patent (and/or other) references that contain the names of the inventors/authors.

Further, in this example, for each user selection (e.g., an item that a user acted upon, such as choosing a contact name) a mechanism is provided that:

(1) Determines one or more lists (from the full list of potential contact lists) to be searched for a particular acted-upon selection (in one specific example, each selection may be made from an interface such as highlight-based or left-click). The highest priority list would be (in this example) a particular software application's own context-specific history of previous user searches (and subsequent selections such as, for example, for performance and accuracy reasons). Further, a determination may be made regarding which of the additional contact list(s) to search next. This determination regarding additional contact list(s) may be based on factors known about the context(s) of one or more persons, such context information including (but not limited to): (a) the open window(s) on the user's desktop; (b) recently accessed application(s) and their internal contact lists (e.g., LOTUS NOTES was just closed, or the FACEBOOK application/browser window was just closed); (c) the application currently in use (e.g., chat application vs. email vs. web browser—which would likely each have their own contact list(s)); (d) frequency of communications (and/or recent communications) with people with that name (e.g., much more email recently with the potential contact's name than in recent chat conversations); and/or (e) context of the source of the selection (e.g., work communications in LOTUS NOTES v. social contacts in FACEBOOK).

(2) Searches for the acted-upon selection based on the previously-calculated sequence of lists (that is, the sequence of lists calculated in (1) above).

(3) Additionally, a multi-step search for the acted-upon selection could be performed based on the previously-calculated sequence of contact lists (that is, the sequence of lists calculated in (1) above). For example: (a) George selecting the phone conversation with Tom "Are you coming to the 3 pm meeting with Harry?" would cause: (i) a calendar lookup for a meeting with Tom and Harry finding a meeting with harry@corp.com; (ii) an internal organization directory lookup for harry@corp.com resulting in Harry Smith; (iii) a phone conversation with Harry Smith initiated to his work phone number; and/or (b) "Harry" selected in an email where the discussion is about Software Architecture would cause: (i) an email lookup, finding previous emails about Software Architecture including reference to "Harry Smith" among conversations within the company's intranet; (ii) an internal organization directory lookup for Harry Smith's email address; and (iii) an email initiated to Harry Smith's email address; and/or (c) The conference room "123ABC" selected in a chat session would cause: (i) a conference room lookup, finding that Harry Smith is responsible for the room; (ii) a chat contact lookup for Harry Smith's contact information; and (iii) a chat session with Harry Smith would be initiated.

(4) Further, tie-breaking (e.g., when the non-unique selection could result in multiple matching results) could be performed. In one example, such tie-breaking may be performed based upon factors known about a context, such as (but not limited to): (a) frequency of a plurality of names in a conversation being used together (e.g., Tom, George and Harry are all on the same team); (b) frequency of communicating with a given match within a particular software application (e.g., chat, email, etc.); (c) frequency of communicating with a given match in any other general software application(s); and/or (d) frequency of communicating with a given match regarding that particular conversation context (e.g., "load balancing" v. "admin console").

In another example, a mechanism may be provided to enable a user to give feedback on the accuracy/priorities/decision-making of the matches. Such feedback may be retained (e.g., in a private history/contact list) to ensure that results are more accurate in subsequent instances.

Figure 1:
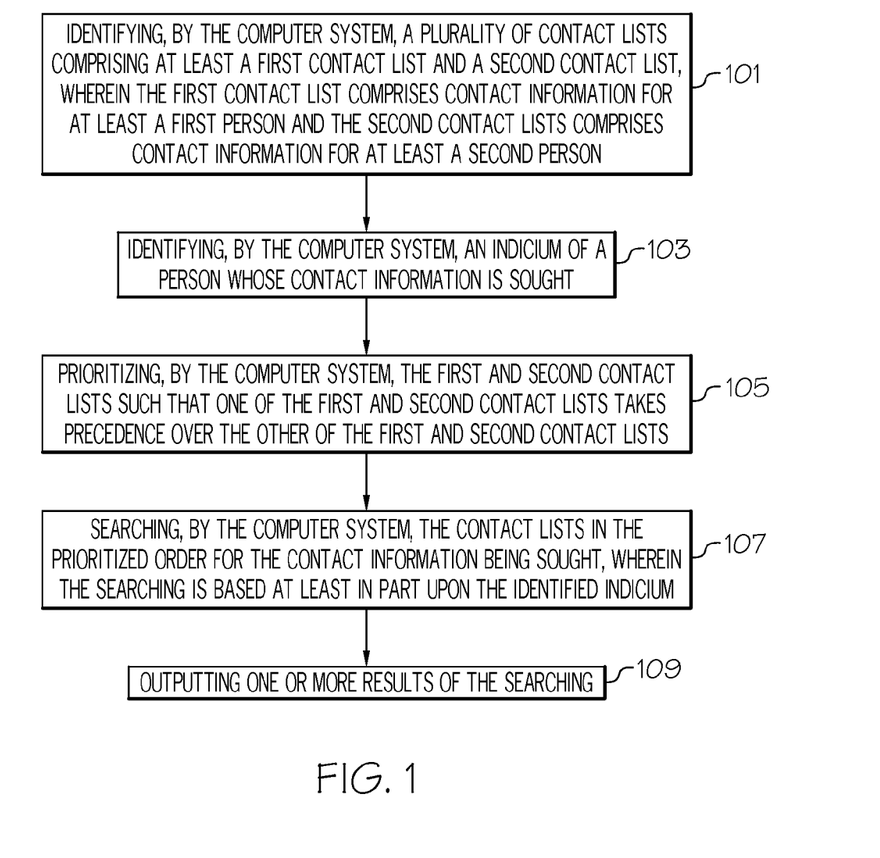
FIG. 1 depicts a flowchart of a method according to an embodiment of the present invention.

Referring now to FIG. 1, a method implemented in a computer system for providing prioritized contact communications is shown. As seen in this FIG. 1, the method of this embodiment comprises: at 101—identifying, by the computer system, a plurality of contact lists comprising at least a first contact list and a second contact list, wherein the first contact list comprises contact information for at least a first person and the second contact lists comprises contact information for at least a second person; at 103—identifying, by the computer system, an indicium of a person whose contact information is sought; at 105—prioritizing, by the computer system, the first and second contact lists such that one of the first and second contact lists takes precedence over the other of the first and second contact lists; at 107—searching, by the computer system, the contact lists in the prioritized order for the contact information being sought, wherein the searching is based at least in part upon the identified indicium; and at 109—outputting one or more results of the searching.

While first and second contact lists are described in this example, the plurality of contact lists may comprise any desired number of contact lists (and the prioritization may apply to any desired number of contact lists).

Further, while a single indicium of a person whose contact information is sought is described in this example, a plurality of indicia may relate to the person whose contact information is sought.

Further, while contact information for first and second people are described in this example, the contact information may relate to any desired number of people.

In another example, any steps may be carried out in the order recited or the steps may be carried out in another order.

Figure 2:
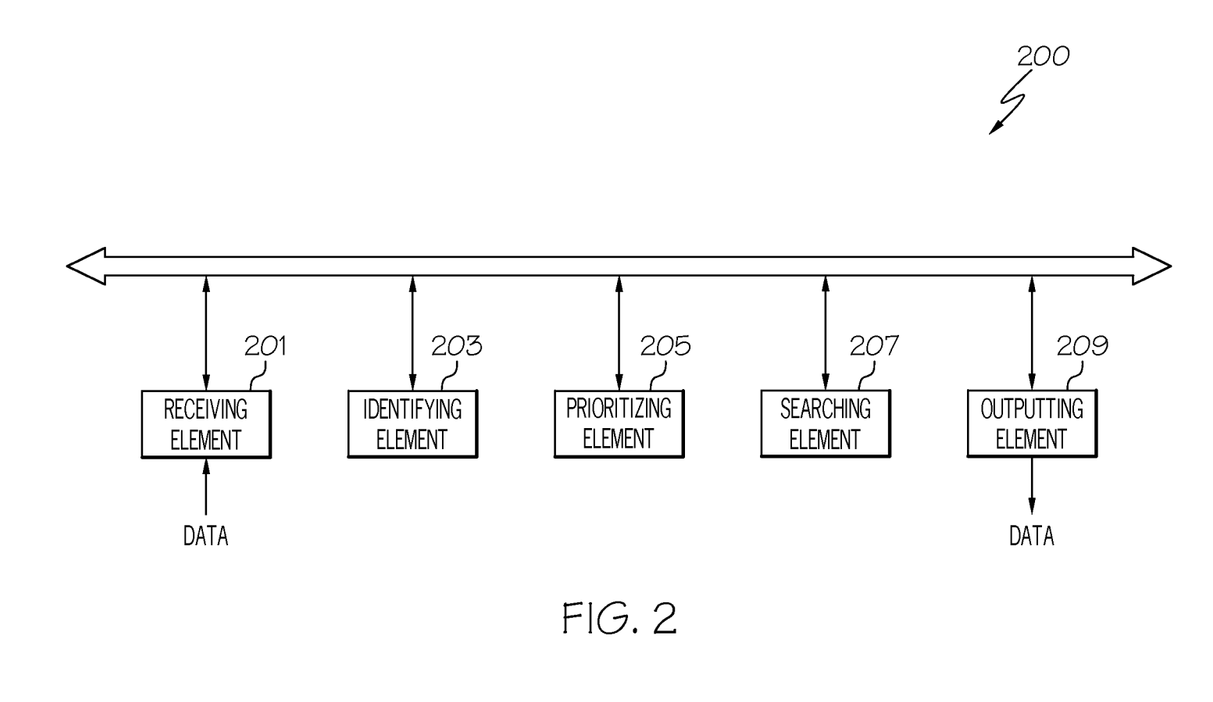
FIG. 2 depicts a block diagram of a system according to an embodiment of the present invention.

Referring now to FIG. 2, in another embodiment, a system 200 for providing prioritized contact communications is provided. This system may include the following elements: a receiving element 201 configured to receive data; an identifying element 203 in operative communication with the receiving element configured to identify: (a) a plurality of contact lists comprising at least a first contact list and a second contact list, wherein the first contact list comprises contact information for at least a first person and the second contact lists comprises contact information for at least a second person; and (b) an indicium of a person whose contact information is sought; a prioritizing element 205 in operative communication with the identifying element configured to prioritize the first and second contact lists such that one of the first and second contact lists takes precedence over the other of the first and second contact lists; a searching element 207 in operative communication with the identifying element and the prioritizing element configured to search the contact lists in the prioritized order for the contact information being sought, wherein the searching is based at least in part upon the identified indicium; and an outputting element 209 in operative communication with the searching element configured to output one or more search results.

In one example, the data received by the receiving element 201 comprises: (a) the plurality of contact lists comprising at least the first contact list and the second contact list, wherein the first contact list includes contact information for at least a first person and the second contact lists includes contact information for at least a second person; and (b) the indicium of the person whose contact information is sought.

In another example, the data received by the receiving element 201 may come from one or more computer memories, one or more databases, or the like.

In another example, the data output by the outputting element comprises one or more search results.

In one example, communication between and among the various components of FIG. 2 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 4.

Figure 3:
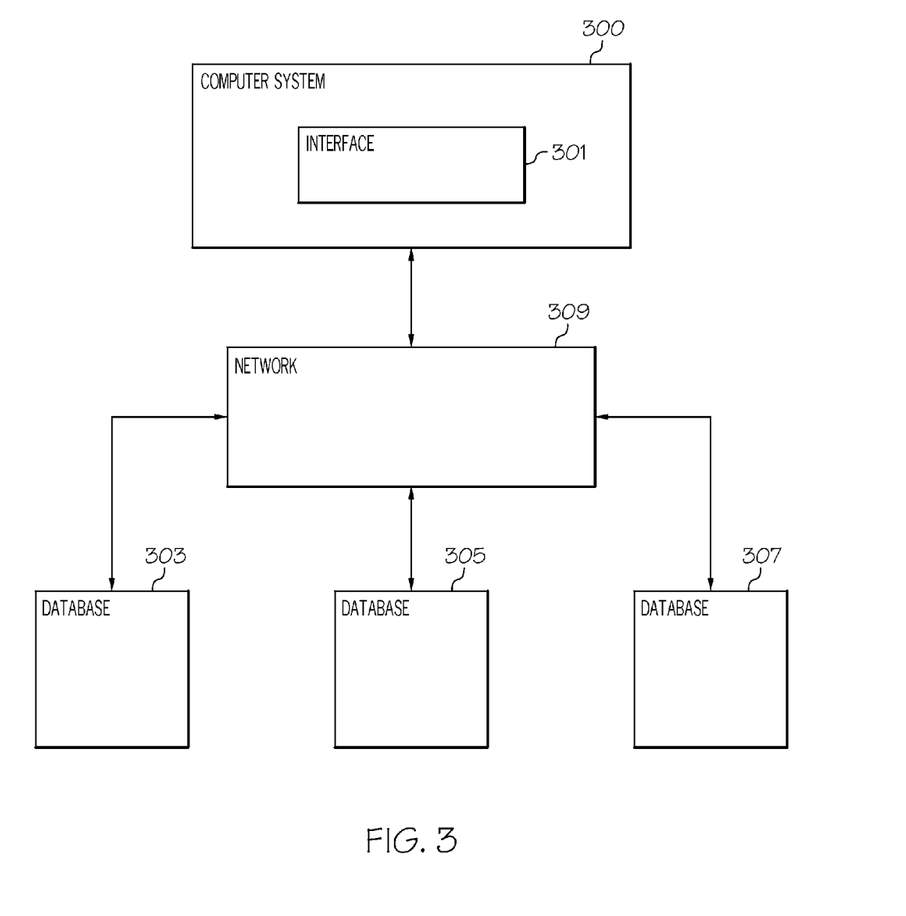
FIG. 3 depicts a block diagram of a system according to an embodiment of the present invention.

Referring now to FIG. 3, in another embodiment, a system 300 for providing prioritized contact communications is provided. As seen in this FIG. 3, the system 300 may be of the type shown in FIG. 2. In other examples, system 300 may comprise a desktop computer, a laptop computer, a tablet, a smart phone or the like.

Further, system 300 may include an interface 301 (e.g., GUI) that provides user input (such as selection (or other identification such as text input) of an indicium of a person whose contact information is sought). In one specific example, the user interface may be in operative communication with receiving element 201 and/or identifying element 203 of FIG. 2.

Further still, the interface 301 may receive various data for display. In one specific example, the user interface may be in operative communication with outputting element 201 of FIG. 2 to display one or more search results.

In another example, the one or more search results may additionally (or alternatively) be used for other purposes, such as to initiate one or more communications (e.g., email, chat, IM).

Still referring to FIG. 3, it is seen that computer system 300 may receive and/or transmit data from/to one or more databases, shown here as database 303, database 305 and database 307 (while three databases are shown, any desired number of databases may be utilized).

Still referring to FIG. 3, communication between and/or among system 300, database 303, database 305 and database 307 may be carried out via network 309. In one example, network 309 may comprise the Internet, an intranet, a local area network, a wide area network and/or any other desired communication channel(s). In another example, some or all of these elements may be implemented in a computer system of the type shown in FIG. 4.

In one example, one or more of database 303, database 305 and database 307 may store thereon one or more contact lists.

Figure 4:
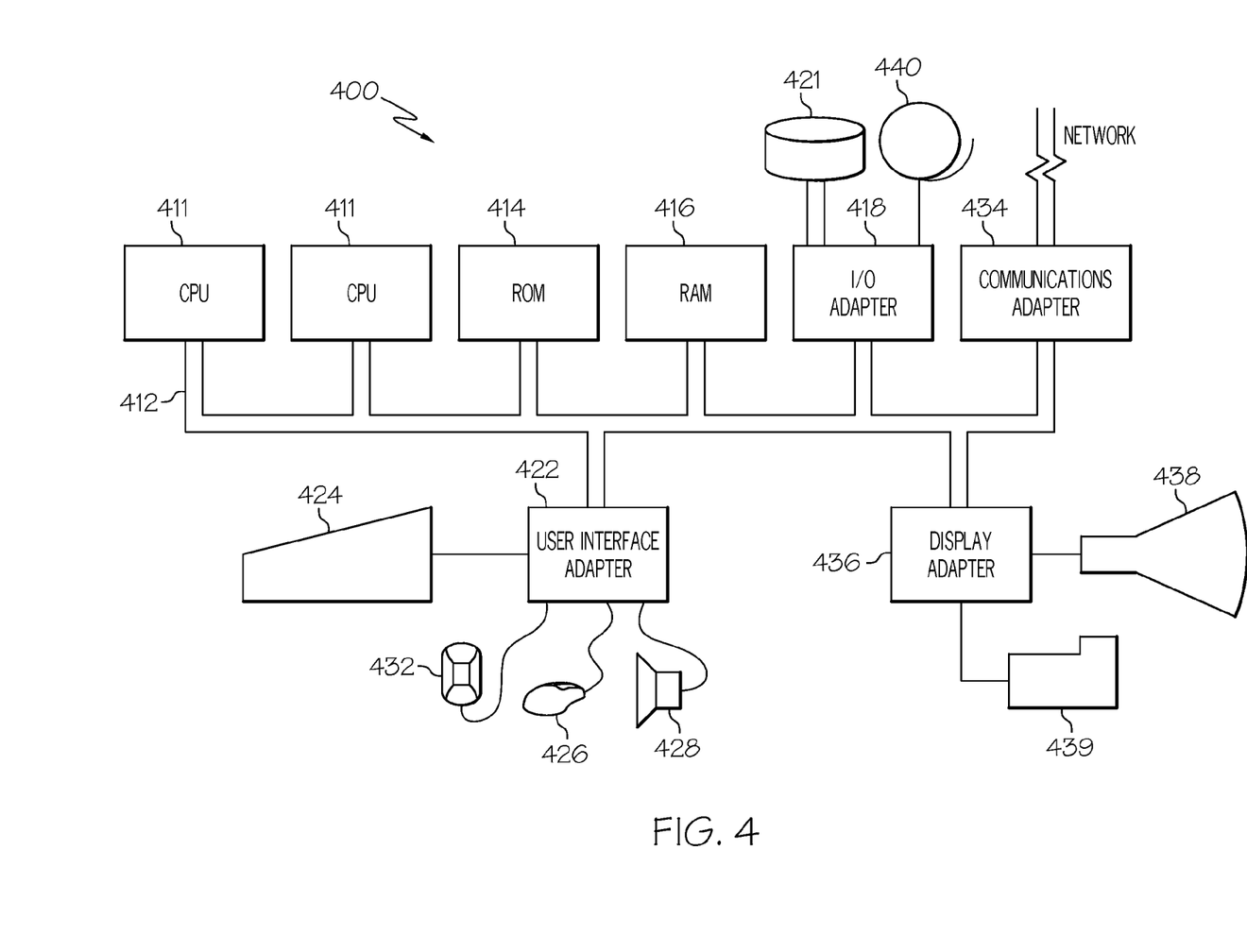
FIG. 4 depicts a block diagram of a system according to an embodiment of the present invention.

Referring now to FIG. 4, this figure shows a hardware configuration of computing system 400 according to an embodiment of the present invention. As seen, this hardware configuration has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communications adapter 434 for connecting the system 400 to a data processing network, the Internet, an Intranet, a local area network (LAN), etc., and a display adapter 436 for connecting the bus 412 to a display device 438 and/or printer 439 (e.g., a digital printer or the like).

As described herein, mechanisms may be provided for searching for a potentially non-unique name within a set of contact lists (e.g., chat contacts, email contacts, phone list contacts, FACEBOOK contacts, white pages, a company directory) in a prioritized way based on factors known about a context (e.g., a current context and/or an historical context) associated with one or more people (e.g., a person whose contact information is sought and/or a person who is seeking the contact information).

In various examples, multi-step (and/or iterative) searching may be provided. Further, tie-breaking to choose a particular contact (when the non-unique selection could result in multiple matching results) may be provided (e.g., based on factors known about a context (e.g., a current context and/or an historical context) associated with one or more people (e.g., a person whose contact information is sought and/or a person who is seeking the contact information).

As described herein, mechanisms are provided for determining and implementing prioritized contact communications (e.g., in an online social networking environment). The mechanism may include (but not be limited to): a social network having multiple participants interconnected therewith; contact information associated with each participant; at least one contact list having the contact information of the participants; a contact list search system; and a prioritized list of contacts generated by the contact list search system based on a context (e.g., a current context) of each participant. In operation, a communication may be sent to at least one contact identified from the prioritized list of contacts.

In other examples, mechanisms are provided to utilize a user selection to search for contact information using multiple search engines that are not predefined in a hierarchical relationship, but are searched based on criteria (e.g., frequency of communications, the context of the selection).

In other examples, mechanisms are provided to search for contact information when a name is not clearly identified as a member of the contact (that is, the situation when the name clicked or otherwise selected is not explicitly part of a contact list).

As described herein, various embodiments provide mechanisms that resolve/disambiguate non-unique person names based on one or more contexts, such as frequency of communication and/or preferences of a user.

As described herein, various embodiments provide mechanisms that perform disambiguation. In various examples, historical context-sensitive data (more than simple frequency of communication with a given name) may be taken into account during disambiguation. In this regard, accuracy of disambiguation may be increased when disambiguation is based on the history of communication, including (but not limited to): (a) frequency of the names in the conversation being used together; (b) frequency of communicating with a given match within a particular software application; and/or (c) frequency of communicating with a given match in email, chat or any other application.

As described herein, various embodiments provide mechanisms that take into account the subject/topic of the emails, chat conversations, etc. to help in the disambiguation. In this regard, accuracy of disambiguation may be increased when disambiguation is based on the subject/topic of the communication, including (but not limited to) frequency of communicating with a given match regarding that subject/topic.

In other examples, mechanisms are provided for delivery in cross-application solutions (e.g., computer and smart phone operating systems and/or specific applications that can monitor other applications) and/or within a multi-aspect application such as FACEBOOK, YAHOO and/or GOOGLE that have multiple mail, chat, collaboration pieces embedded.

In other examples, mechanisms are provided for precedence of search and choosing among non-unique matches across a single list and/or across multiple lists.

As described herein, various embodiments provide mechanisms for resolution of non-unique name selections in one or more "contact brokers" (wherein a contact broker is a system that will take a name as input and initiate contact to that person).

As described herein, various embodiments provide mechanisms for contextual collaboration.

As described herein, various embodiments provide mechanisms for determining a contact based on mobile context vs. desktop context.

As described herein, various embodiments provide mechanisms for determining a contact based on work context vs. social context (e.g., Joe my friend vs. Joe my boss).

As described herein, various embodiments provide mechanisms for tying one or more people to a context of a particular user (e.g., "my" context) prior to searching for a particular contact.

In another embodiment, a method implemented in a computer system for providing prioritized contact communications is provided, the method comprising: identifying, by the computer system, a plurality of contact lists comprising at least a first contact list and a second contact list, wherein the first contact list comprises contact information for at least a first person and the second contact lists comprises contact information for at least a second person; identifying, by the computer system, an indicium of a person whose contact information is sought; prioritizing, by the computer system, the first and second contact lists such that one of the first and second contact lists takes precedence over the other of the first and second contact lists; and searching, by the computer system, the contact lists in the prioritized order for the contact information being sought, wherein the searching is based at least in part upon the identified indicium.

In one example, the method further comprises outputting one or more results of the searching.

In another example, the prioritizing is performed such that the precedence is based at least in part upon at least one of: (a) a current context of the person whose contact information is sought; and (b) a current context of a person who is seeking the contact information.

In another example, the current context of the person whose contact information is sought is selected from the group including: (a) a frequency of communication between the person whose contact information is sought and at least one other person; (b) a current communication mode being used by the person whose contact information is sought; (c) a frequently used historic communication mode used by the person whose contact information is sought; (d) a current status, in an online application, of the person whose contact information is sought; and (e) a frequently used historic status, in an online application, of the person whose contact information is sought.

In another example, the at least one other person is the person who is seeking the contact information.

In another example, the current context of the person who is seeking the contact information is selected from the group including: (a) a frequency of communication between the person who is seeking the contact information and at least one other person; (b) a current communication mode being used by the person who is seeking the contact information; (c) a frequently used historic communication mode used by the person who is seeking the contact information; (d) a current status, in an online application, of the person who is seeking the contact information; and (e) a frequently used historic status, in an online application, of the person who is seeking the contact information.

In another example, the at least one other person is the person whose contact information is sought.

In another example, the identified indicium is unique relative to contact information in the plurality of contact lists, such that the identified indicium corresponds to only one person.

In another example, the identified indicium is non-unique relative to contact information in the plurality of contact lists, such that the identified indicium corresponds to at least two people.

In another example, a tie-breaking process is performed to select one of the at least two people to which the non-unique indicium corresponds.

In another example, the tie-breaking process is performed based at least in part upon at least one of: (a) a current context of the person whose contact information is sought; and (b) a current context of a person who is seeking the contact information.

In another example, the method further comprises receiving, by the computer system, the plurality of contact lists.

In another example, the method further comprises receiving, by the computer system, the indicium of the person whose contact information is sought.

In another embodiment a computer readable storage medium, tangibly embodying a program of instructions executable by the computer for providing prioritized contact communications is provided, the program of instructions, when executing, performing the following steps: identifying, by the computer, a plurality of contact lists comprising at least a first contact list and a second contact list, wherein the first contact list comprises contact information for at least a first person and the second contact lists comprises contact information for at least a second person; identifying, by the computer, an indicium of a person whose contact information is sought; prioritizing, by the computer, the first and second contact lists such that one of the first and second contact lists takes precedence over the other of the first and second contact lists; and searching, by the computer, the contact lists in the prioritized order for the contact information being sought, wherein the searching is based at least in part upon the identified indicium.

In one example, the program of instructions further outputs one or more results of the searching.

In another example, the program of instructions performs the prioritizing such that the precedence is based at least in part upon at least one of: (a) a current context of the person whose contact information is sought; and (b) a current context of a person who is seeking the contact information.

In another example, the current context of the person whose contact information is sought is selected from the group including: (a) a frequency of communication between the person whose contact information is sought and at least one other person; (b) a current communication mode being used by the person whose contact information is sought; (c) a frequently used historic communication mode used by the person whose contact information is sought; (d) a current status, in an online application, of the person whose contact information is sought; and (e) a frequently used historic status, in an online application, of the person whose contact information is sought.

In another example, the at least one other person is the person who is seeking the contact information.

In another example, the current context of the person who is seeking the contact information is selected from the group including: (a) a frequency of communication between the person who is seeking the contact information and at least one other person; (b) a current communication mode being used by the person who is seeking the contact information; (c) a frequently used historic communication mode used by the person who is seeking the contact information; (d) a current status, in an online application, of the person who is seeking the contact information; and (e) a frequently used historic status, in an online application, of the person who is seeking the contact information.

In another example, the at least one other person is the person whose contact information is sought.

In another example, the identified indicium is unique relative to contact information in the plurality of contact lists, such that the identified indicium corresponds to only one person.

In another example, the identified indicium is non-unique relative to contact information in the plurality of contact lists, such that the identified indicium corresponds to at least two people.

In another example, the program of instructions performs a tie-breaking process to select one of the at least two people to which the non-unique indicium corresponds.

In another example, the program of instructions performs the tie-breaking based at least in part upon at least one of: (a) a current context of the person whose contact information is sought; and (b) a current context of a person who is seeking the contact information.

In another example, the program of instructions further performs receiving the plurality of contact lists.

In another example, the program of instructions further performs receiving the indicium of the person whose contact information is sought.

In another embodiment, a computer-implemented system for providing prioritized contact communications is provided, the system comprising: an identifying element configured to identify: (a) a plurality of contact lists comprising at least a first contact list and a second contact list, wherein the first contact list comprises contact information for at least a first person and the second contact lists comprises contact information for at least a second person; and (b) an indicium of a person whose contact information is sought; a prioritizing element in operative communication with the identifying element configured to prioritize the first and second contact lists such that one of the first and second contact lists takes precedence over the other of the first and second contact lists; and a searching element in operative communication with the identifying element and the prioritizing element configured to search the contact lists in the prioritized order for the contact information being sought, wherein the searching is based at least in part upon the identified indicium.

In one example, the system further comprises an outputting element in operative communication with the searching element configured to output one or more results of the searching.

In another example, the system further comprises a receiving element configured to receive: (a) the plurality of contact lists; and (b) the indicium of the person whose contact information is sought.

In another example, the prioritizing is performed by the prioritizing element such that the precedence is based at least in part upon at least one of: (a) a current context of the person whose contact information is sought; and (b) a current context of a person who is seeking the contact information.

In another example, the current context of the person whose contact information is sought is selected from the group including: (a) a frequency of communication between the person whose contact information is sought and at least one other person; (b) a current communication mode being used by the person whose contact information is sought; (c) a frequently used historic communication mode used by the person whose contact information is sought; (d) a current status, in an online application, of the person whose contact information is sought; and (e) a frequently used historic status, in an online application, of the person whose contact information is sought.

In another example, the at least one other person is the person who is seeking the contact information.

In another example, the current context of the person who is seeking the contact information is selected from the group including: (a) a frequency of communication between the person who is seeking the contact information and at least one other person; (b) a current communication mode being used by the person who is seeking the contact information; (c) a frequently used historic communication mode used by the person who is seeking the contact information; (d) a current status, in an online application, of the person who is seeking the contact information; and (e) a frequently used historic status, in an online application, of the person who is seeking the contact information.

In another example, the at least one other person is the person whose contact information is sought.

In another example, the identified indicium is unique relative to contact information in the plurality of contact lists, such that the identified indicium corresponds to only one person.

In another example, the identified indicium is non-unique relative to contact information in the plurality of contact lists, such that the identified indicium corresponds to at least two people.

In another example, the system further comprises a tie-breaking element in operative communication with the searching element configured to select one of the at least two people to which the non-unique indicium corresponds.

In another example, the tie-breaking element selects the one of the at least two people to which the non-unique indicium corresponds based at least in part upon at least one of: (a) a current context of the person whose contact information is sought; and (b) a current context of a person who is seeking the contact information.

As described herein, various embodiments provide mechanisms that: (a) search for a potentially non-unique name within a set of contact lists (e.g., chat contacts, email contacts, phone list contacts, FACEBOOK contacts, white pages, an internal organization directory) in a prioritized way based on factors known about a context (e.g., a current context); (b) perform further multi-step searching for a name based on the above prioritized search results; and (c) determine a subsequent communications method that is appropriate for the current context.

In another embodiment, once there is a match to contact information, the matching action (e.g., the search results) would initiate a subsequent appropriate communication with the matched contact. In various examples, the appropriate communication may be: (a) chat if the context is instant messaging; (b) email if the context is messaging, but the person is not present in the chat system; (c) chat if the user's preferences are set to always use chat, if available.

In another embodiment, a communication is made (based upon contact information search results) according to a specified preference and/or according to a communication mode the current context associates with the matching contact in the prioritized list of contacts.

In another embodiment, determining the appropriate communications method to use when establishing the communication channel with the matching contact may be based on previous pattern(s) used with that contact.

In another embodiment, multi-step searching for a contact name based on the prioritized search results may be provided in order to get the communications method that is appropriate for a current context.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for providing prioritized contact communications, the method comprising:
    identifying, by the computer system, a plurality of contact lists comprising at least a first contact list and a second contact list, wherein the first contact list comprises contact information for at least a first person and the second contact lists comprises contact information for at least a second person;
    identifying, by the computer system, an indicium of a person whose contact information is sought;
    prioritizing, by the computer system, the first and second contact lists such that one of the first and second contact lists takes precedence over the other of the first and second contact lists; and
    searching, by the computer system, the contact lists in the prioritized order for the contact information being sought, wherein the searching is based at least in part upon the identified indicium.

2. The method of claim 1, further comprising outputting one or more results of the searching.

3. The method of claim 1, wherein the prioritizing is performed such that the precedence is based at least in part upon at least one of: (a) a current context of the person whose contact information is sought; and (b) a current context of a person who is seeking the contact information.

4. The method of claim 3, wherein the current context of the person whose contact information is sought is selected from the group including: (a) a frequency of communication between the person whose contact information is sought and at least one other person; (b) a current communication mode being used by the person whose contact information is sought; (c) a frequently used historic communication mode used by the person whose contact information is sought; (d) a current status, in an online application, of the person whose contact information is sought; and (e) a frequently used historic status, in an online application, of the person whose contact information is sought.

5. The method of claim 4, wherein the at least one other person is the person who is seeking the contact information.

6. The method of claim 3, wherein the current context of the person who is seeking the contact information is selected from the group including: (a) a frequency of communication between the person who is seeking the contact information and at least one other person; (b) a current communication mode being used by the person who is seeking the contact information; (c) a frequently used historic communication mode used by the person who is seeking the contact information; (d) a current status, in an online application, of the person who is seeking the contact information; and (e) a frequently used historic status, in an online application, of the person who is seeking the contact information.

7. The method of claim 6, wherein the at least one other person is the person whose contact information is sought.

8. The method of claim 1, wherein the identified indicium is unique relative to contact information in the plurality of contact lists, such that the identified indicium corresponds to only one person.

9. The method of claim 1, wherein the identified indicium is non-unique relative to contact information in the plurality of contact lists, such that the identified indicium corresponds to at least two people.

10. The method of claim 9, wherein a tie-breaking process is performed to select one of the at least two people to which the non-unique indicium corresponds.

11. The method of claim 10, wherein the tie-breaking process is performed based at least in part upon at least one of: (a) a current context of the person whose contact information is sought; and (b) a current context of a person who is seeking the contact information.

12. The method of claim 1, further comprising receiving, by the computer system, the plurality of contact lists.

13. The method of claim 1, further comprising receiving, by the computer system, the indicium of the person whose contact information is sought.

14. A computer readable storage device, tangibly embodying a program of instructions executable by the computer for providing prioritized contact communications, the program of instructions, when executing, performing the following steps:
  identifying, by the computer, a plurality of contact lists comprising at least a first contact list and a second contact list, wherein the first contact list comprises contact information for at least a first person and the second contact lists comprises contact information for at least a second person;
  identifying, by the computer, an indicium of a person whose contact information is sought;
  prioritizing, by the computer, the first and second contact lists such that one of the first and second contact lists takes precedence over the other of the first and second contact lists; and
  searching, by the computer, the contact lists in the prioritized order for the contact information being sought, wherein the searching is based at least in part upon the identified indicium.

15. The computer readable storage device of claim 14, wherein the program of instructions further outputs one or more results of the searching.

16. The computer readable storage device of claim 14, wherein the program of instructions performs the prioritizing such that the precedence is based at least in part upon at least one of: (a) a current context of the person whose contact information is sought; and (b) a current context of a person who is seeking the contact information.

17. A computer-implemented system for providing prioritized contact communications, the system comprising:
  a processor; and
  a memory storing computer readable instructions that, when executed by the processor, implement:
  an identifying element configured to identify: (a) a plurality of contact lists comprising at least a first contact list and a second contact list, wherein the first contact list comprises contact information for at least a first person and the second contact lists comprises contact information for at least a second person; and (b) an indicium of a person whose contact information is sought;
  a prioritizing element in operative communication with the identifying element configured to prioritize the first and second contact lists such that one of the first and second contact lists takes precedence over the other of the first and second contact lists; and
  a searching element in operative communication with the identifying element and the prioritizing element configured to search the contact lists in the prioritized order for the contact information being sought, wherein the searching is based at least in part upon the identified indicium.

18. The system of claim 17, wherein the computer readable instructions, when executed by the processor, further implement an outputting element in operative communication with the searching element configured to output one or more results of the searching.

19. The system of claim 17, wherein the computer readable instructions, when executed by the processor, further implement a receiving element configured to receive: (a) the plurality of contact lists; and (b) the indicium of the person whose contact information is sought.

* * * * *